(12) United States Patent
Dumas

(10) Patent No.: US 8,079,155 B2
(45) Date of Patent: Dec. 20, 2011

(54) PLUMB POST APPARATUS HAVING BIPOD LEGS AND METHOD OF USE THEREOF

(76) Inventor: Reginald Dumas, Conyers, GA (US)

(*) Notice: Subject to any disclaimer, the term of this patent is extended or adjusted under 35 U.S.C. 154(b) by 0 days.

(21) Appl. No.: 12/777,584

(22) Filed: May 11, 2010

(65) Prior Publication Data
US 2011/0277330 A1 Nov. 17, 2011

(51) Int. Cl.
*G01C 15/10* (2006.01)
(52) U.S. Cl. .......................... 33/404; 33/407
(58) Field of Classification Search .............. 33/404, 33/405, 406, 407, 408, 409, 410
See application file for complete search history.

(56) References Cited

U.S. PATENT DOCUMENTS

| | | | |
|---|---|---|---|
| 1,643,915 A * | 9/1927 | Angelilli | 33/408 |
| 2,585,283 A | 2/1952 | Sommers | |
| 2,656,608 A * | 10/1953 | Craig et al. | 33/406 |
| 2,816,368 A | 12/1957 | Salopek, Jr. | |
| 3,030,738 A | 4/1962 | Brewer et al. | |
| 3,520,061 A | 7/1970 | Wigglesworth | |
| 4,074,503 A | 2/1978 | Watt et al. | |
| 4,093,172 A | 6/1978 | Johnson | |
| 4,359,850 A * | 11/1982 | Sinkes | 33/406 |
| 4,443,954 A * | 4/1984 | Clark | 33/404 |
| 5,125,814 A | 6/1992 | Lester | |
| 5,136,785 A | 8/1992 | Shirley | |
| 7,017,308 B2 | 3/2006 | Marshall | |
| 7,310,888 B2 * | 12/2007 | Gilliland | 33/404 |
| 7,320,181 B2 | 1/2008 | Charpentier | |
| 7,673,393 B1 * | 3/2010 | Hudson | 33/409 |
| 2007/0130878 A1 * | 6/2007 | Davis | 33/407 |

* cited by examiner

*Primary Examiner* — G. Bradley Bennett
(74) *Attorney, Agent, or Firm* — Williamson Intellectual Property Law, LLC; Thomas R. Williamson, III

(57) ABSTRACT

A plumb post apparatus for retaining a mason's line for laying a brick course, the apparatus comprising two vertical posts each having two legs of adjustable length that pivot outward to form stabilizers. The legs are secured to adjacent sides of the posts, thus extending at right angles to each other. The posts can be secured via spikes through base plates at the bottoms of the posts and the legs are secured in place via stakes that are pivotally secured to the ends of the legs and which can be driven into a ground surface. Levels on adjacent sides of the posts indicate when the apparatus is in level disposition.

20 Claims, 4 Drawing Sheets

PLUMB POST APPARATUS HAVING BIPOD LEGS AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to construction tools, and more specifically to an apparatus for providing a plumb line for laying a course of bricks.

2. Description of Related Art

Bricks, typically made from fired clay, are often utilized to provide a wall surface, both decorative and supporting for construction of buildings or to delineate and prevent entry onto property. Bricks are secured to one another via a cementitious material called mortar that provides both a sealing layer between bricks and also "glues" the bricks together. The art of laying bricks is called brickwork. Brickwork is carried out by a brick mason who applies mortar to bricks, cementing them together after laying them into a course that forms a level section of a wall. One course is "laid" on top of another to build the wall up to a desired height.

While bricks are of uniform thickness, the mortar that cements them in place may be applied both thickly and thinly, resulting in an uneven line of bricks in a course. Thus, it is typical to run a mason's line, strung between two points, which is straight and level to allow the bricklayer to position each brick at the exact correct height in its mortar to ensure that the course is level. As each course is added, slight variations can be compounded; thus, it is necessary that each course be laid out level via the mason's line. This leveling of the mason's line may be accomplished via placing a line level on the string (line) or by "shooting" a transit line and then adjusting the string to correspond to the transit line.

After each course of bricks has been laid, the mason's line is raised to the next position and made level to provide guidance to the bricklayer. In this fashion, a straight, and thus structurally stronger and more aesthetic wall is formed from bricks.

Various devices have been utilized to provide accurate laying of bricks. Many of these provide for level setting of bricks. However, for the most part, they are cumbersome and/or require a great deal of time to initially set in place and to reset as each course is to be laid.

One such device comprises a rigid member with side extensions, wherein the rigid member is placed on the course of bricks with the extensions passing over and resting on the bricks. However, since it rests on the bricks, this device interferes with clear access to the course of bricks and is thus inconvenient.

A similar device comprises a top platform that rests on a new, higher course of bricks with side extensions down both sides of the course. Unfortunately, this again interferes with clear access to the bricks and is thus inconvenient. Another very similar device in structure sits on top of the course of bricks and provides an aperture for application of mortar, but the device must then be removed prior to installation of the brick on top of the mortar. Yet a third similar device adds a handle for convenience, but still must be removed to place the bricks in position.

Another attempt at providing a level course includes a level on an attachment for securing to the bricklayer's hand. This is helpful in keeping bricks level, but does not provide alignment for an entire course of bricks.

Yet another device provides positioning of a mason's line around corner blocks, but does not provide any means of determining whether the corner blocks are level and thus, the line may not be level.

Still another device requires securing of corner hinge sections to the brick course and thus is not easily removable. This device provides an elongated arm that extends down into the hinge and thus can be rotated. Again, this device lacks any means of ensuring that the hinge sections are level.

One other device provides an L-shaped arm secured by plates to the brick course or a framework associated therewith. This device provides a plumb bob for establishing a vertical plane, but is overly complicated and does not provide a horizontal guide for the course of bricks.

Therefore, it is readily apparent that there is a need for a device that can be readily set up to provide a securing point for a mason's line by which bricks can be laid in a course.

BRIEF SUMMARY OF THE INVENTION

Briefly described, in a preferred embodiment, the present invention overcomes the above-mentioned disadvantages and meets the recognized need for such a device by providing a plumb post apparatus comprising two vertical posts each having two legs that pivot outward to form stabilizers for the posts. The legs are secured to adjacent sides of the posts, thus extending at right angles to each other. The posts can be secured via spikes through base plates at the bottoms of the posts and the legs are secured in place via stakes that are pivotally secured to the ends of the legs. Spirit levels on adjacent sides of the posts serve to indicate when the posts are level.

The plumb post apparatus is easily adapted to uneven surfaces, since each post is independently installed. The apparatus can be set up quickly, taken down quickly and moved to another location for subsequent use.

According to its major aspects and broadly stated, the present invention in its preferred form is a plump post apparatus for setting a mason's line for laying a course of bricks, the apparatus having a first substantially-vertical post and a second substantially-vertical post, each post having a front, a back, an inside and an outside, and a first spirit level disposed on the front of each post, and a second spirit level disposed on the outside of each post, the front and outside being adjacent sides of the post.

The apparatus further comprises four legs, two of which are pivotally secured to the first substantially-vertical post, one on the front and one on the outside, and two of which are pivotally secured to the second substantially-vertical post, one on the front and one on the outside. Each of the four legs comprises an upper section and a lower section that are slidably secured together, the lower sections having a slot that extends along a substantial portion of each lower sections, and each of the upper sections has at least three apertures, two of which are dimensioned to receive securing fasteners that engage the slots of the lower sections. The third aperture is dimensioned to receive a pivoting fastener that is utilized to secure the legs to the posts. Each of the legs further comprises a stake pivotally secured at the bottom end of the legs.

Each of the posts has a top end and a bottom end with a base plate secured to the bottom end and the legs being secured at the top end. Each base plate has at least one mounting tab, preferably two, each mounting tab having an aperture dimensioned to receive a spike for securing the post to the ground.

The preferred embodiment further includes a method of setting a plumb line by 1) obtaining a plumb post apparatus as previously described, 2) placing the first substantially-vertical post at a first end of a course for laying bricks and placing the second substantially-vertical post at a second end of the course for laying bricks, such that the insides face each other, 3) adjusting the legs in position until the levels indicate that the posts are vertical, 4) securing the legs in the adjusted position, 5) securing corner blocks to the posts, wherein the corner blocks have a mason's line therebetween, 6) shooting a transit line, 7) adjusting the mason's line to the transit line, 8) staking the legs to a ground surface, 9) securing the base plates to the posts, and 10) securing the posts to a ground surface via a spike driven through the base plates.

More specifically, the present invention is a plumb post apparatus for retaining a builder's line aligned with a transit, the plumb post apparatus having two opposing posts, each post having a top and a bottom, an inside and an outside, a front side and a back side. Attached to each post are two legs that extend outward at right angles to each other. The tops have two sets of throughholes, one disposed above the other, which are separated by a distance dimensioned to ensure that neither throughhole passes through any portion of the other.

One throughhole on each post passes through the post from the front side to the back side, while the other throughhole passes through the post from the inside to the outside. The legs are secured to the posts, at the front sides and the outsides, via pivot fasteners (bolts and wing nuts), that pass through the first and second throughholes, thereby permitting the legs to swing about the pivot fasteners for subsequent positioning.

The posts have two bubble or spirit levels thereon, recessed into the posts, the first level being disposed on the front sides of the posts (or alternatively on the back sides), below the first throughholes, and the second being disposed on the outsides of the posts, below the second throughholes. Further, the posts optionally have base plates fixedly secured at the bottoms of the posts. Each base plate has first and second mounts that have apertures therein for receiving a spike to secure the post to the ground.

The legs comprise stakes having points and pivot holes therein, upper sections and lower sections, wherein the upper sections have first ends and second ends and the lower sections have first termini and second termini.

The upper sections comprise pivot holes, first adjustment apertures and second adjustment apertures, wherein upper pivot holes are preferably disposed at first ends and second adjustment apertures are preferably disposed at second ends, with first adjustment apertures preferably being disposed approximately midway between first ends and second ends. The lower sections have slots therein that begin near the first termini and extend along the lower sections partially toward the second termini which have lower pivot holes therein.

To assemble the legs, the upper sections are secured to the lower sections via fasteners, namely, bolts and wing nuts. A fastener is secured through each of the first adjustment throughholes and the second adjustment throughholes of the upper section, both fasteners engaging the slots of the lower sections, thereby securing each upper section to its respective lower section. The stakes are secured to the lower sections via similar bolt and wing nut fasteners that pass through the stake pivot holes and the lower pivot holes, thereby pivotally securing the stakes to the legs.

To use, the posts are placed at opposite ends of a course where bricks will be laid with the insides of the posts facing each other. Each leg is pivoted outward forming an angle between the leg and its respective post. The legs are subsequently secured to the ground via the stakes, wherein the points of the stakes are driven into the ground. Optionally, the spikes are driven through the base plate apertures to fixedly secure the posts to the ground.

Once the legs are secured, the legs are adjusted to position each of posts in a level disposition by loosening the fasteners securing the upper and lower sections and slidably positioning the upper sections relative to the lower sections, lengthening or shortening the legs as the case may be, until the posts are level, as indicated by the spirit levels. Once the posts are level, the fasteners are tightened to secure the upper sections to lower sections in the selected position, thereby retaining the posts level.

A builder's or mason's line is secured to a set of corner blocks, wherein a corner block is placed on the outside of each post, with the mason's line secured taught between the corner blocks to provide a reference for laying bricks along the brick course.

Accordingly, a feature and advantage of the present invention is its ability to be quickly set up and taken down.

Another feature and advantage of the present invention is its ability to provide a stable mount for a mason's line.

Still another feature and advantage of the present invention is its ability to provide a level mount for a mason's line.

Yet another feature and advantage of the present invention is its ability to be secured to a ground surface.

Yet still another feature and advantage of the present invention is that it can be adapted to any length of course for laying bricks.

A further feature and advantage of the present invention is that it can be installed on uneven surfaces.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred and Selected Alternate Embodiment with reference to the accompanying drawing figures, in which like reference numerals denote similar structure and refer to like elements throughout, and in which.

DETAILED DESCRIPTION OF THE PREFERRED AND SELECTED ALTERNATE EMBODIMENT OF THE INVENTION

Figure 1:
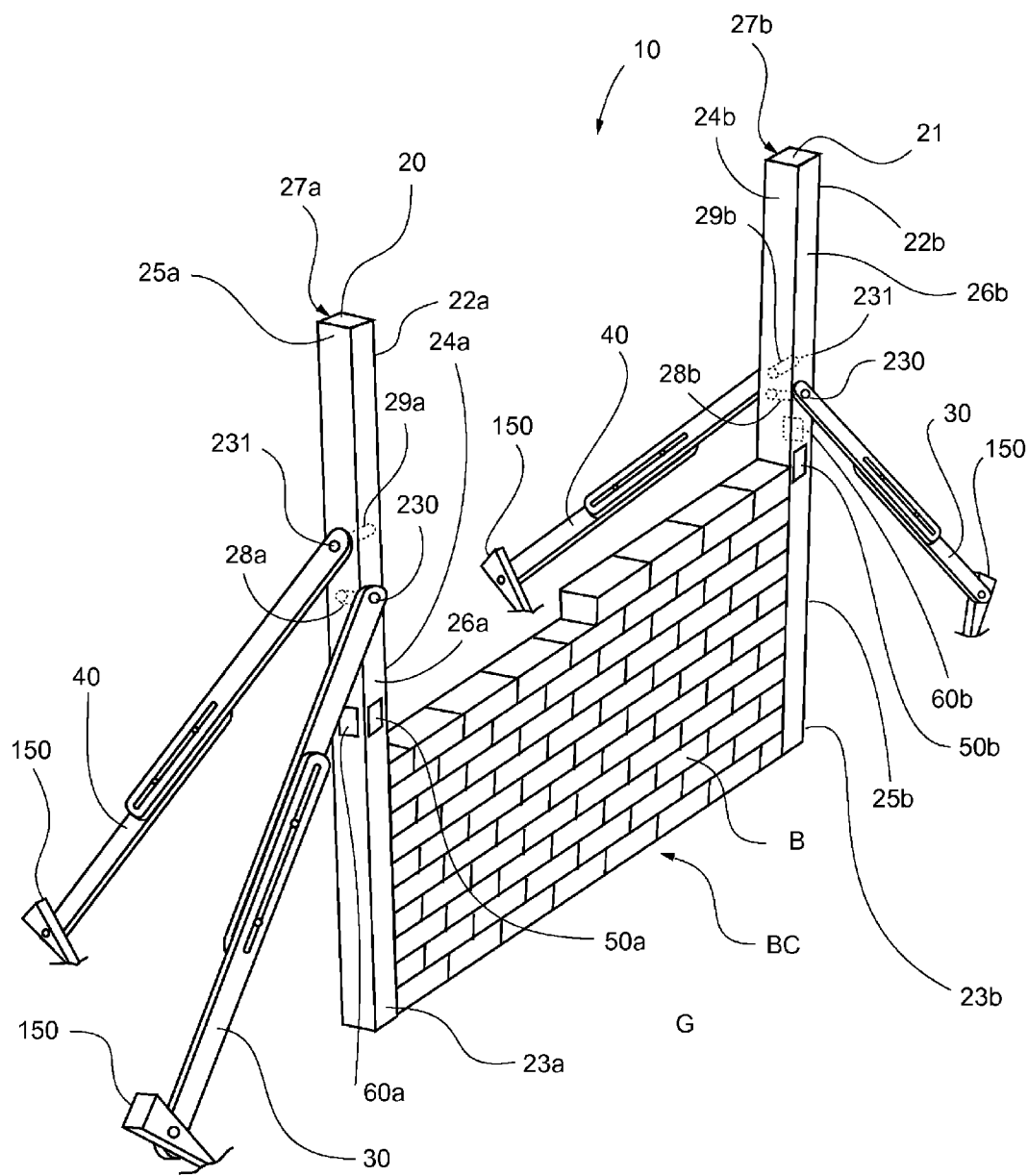
FIG. 1 is a perspective view according to a preferred embodiment, shown in use.
Figure 2:
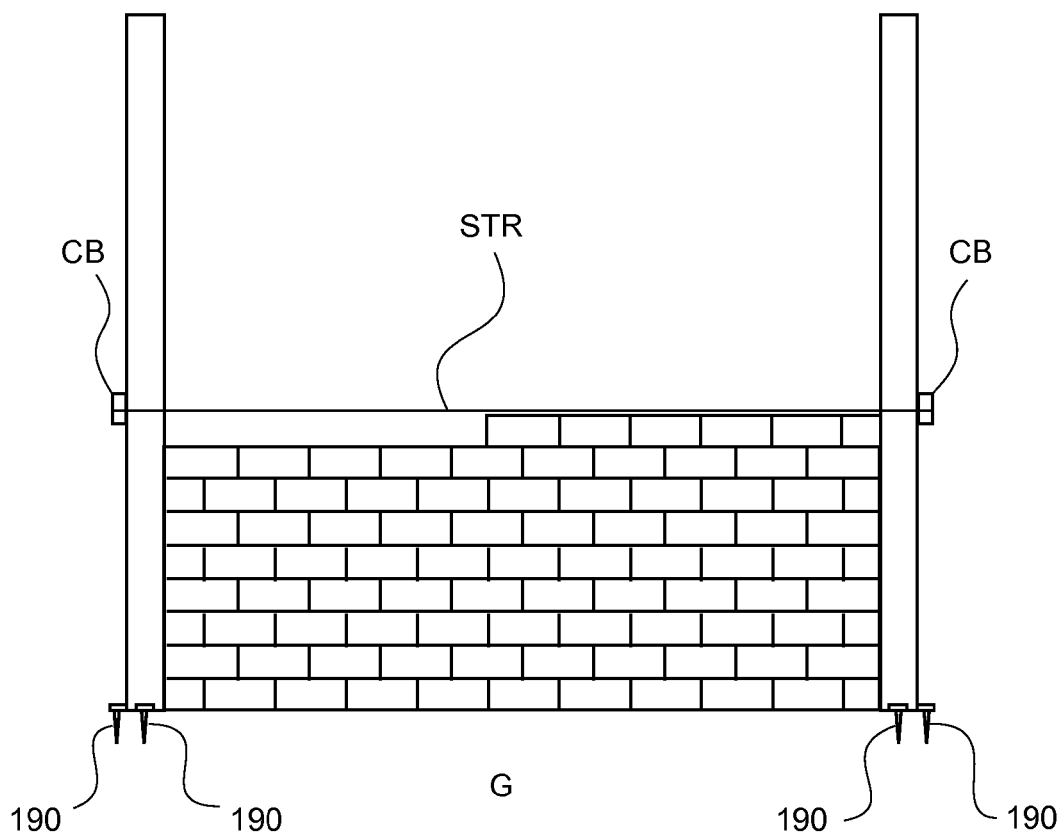
FIG. 2 is a front elevation view according to a preferred embodiment, showing use of a mason's line and securing stakes.
Figure 8:
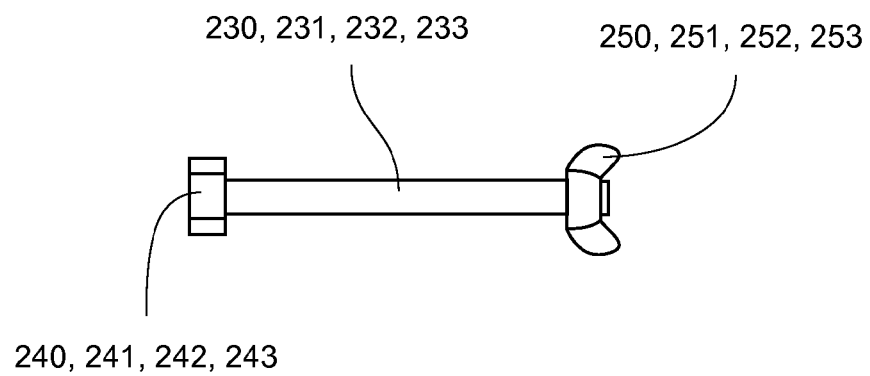
FIG. 8 is a side view of a fastener according to a preferred embodiment.
Figure 3:
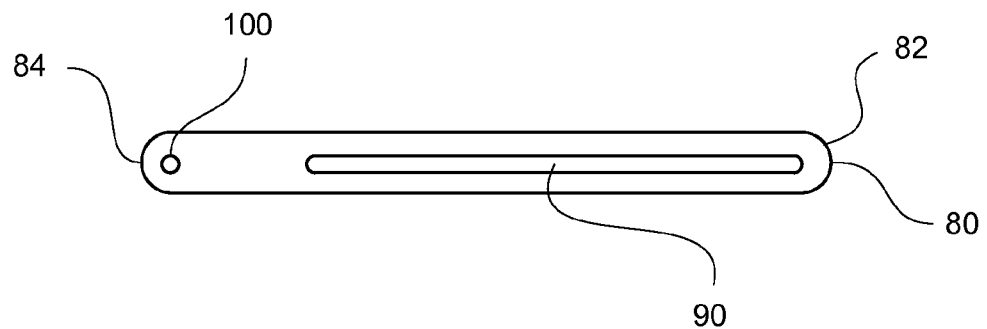
FIG. 3 is a side view of a leg lower section according to a preferred embodiment.
Figure 4:
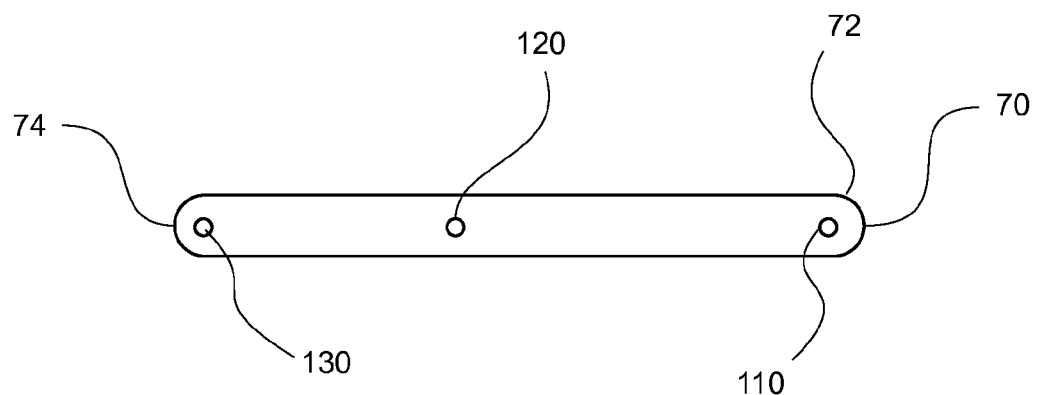
FIG. 4 is a side view of a leg upper section according to a preferred embodiment.
Figure 5:
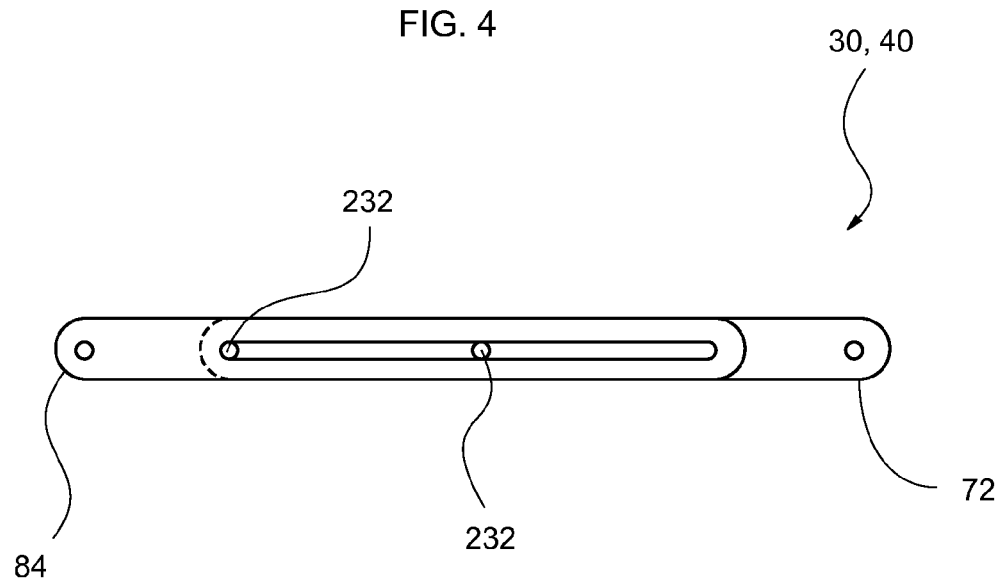
FIG. 5 is a side view of a leg according to a preferred embodiment, shown with lower section of FIG. 3 secured to upper section of FIG. 4.
Figure 6:
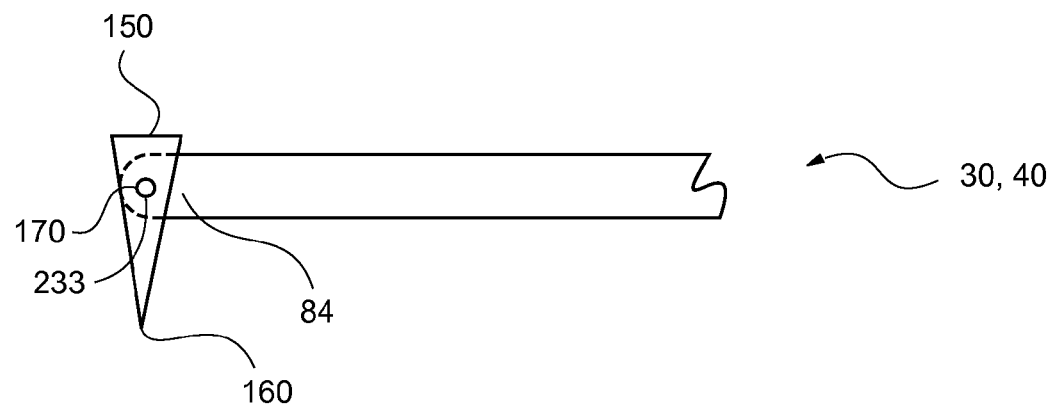
FIG. 6 is a side view of a leg according to a preferred embodiment, showing a stake secured to the end thereof.
Figure 7:
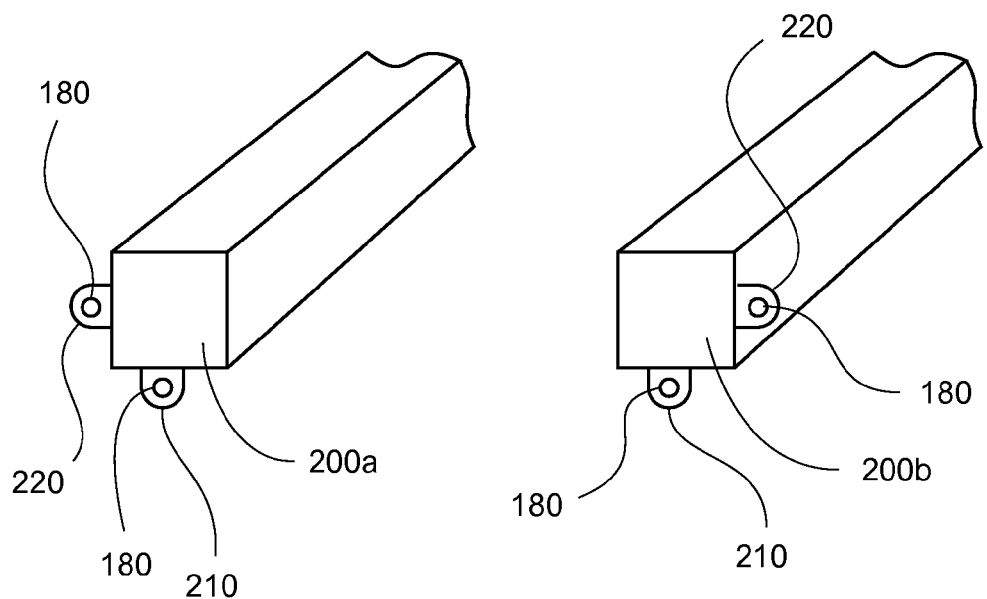
FIG. 7 is a bottom perspective view of post components according to a preferred embodiment, with base plates secured at the bottoms thereof.

In describing the preferred and selected alternate embodiment of the present invention, as illustrated in FIGS. 1-8, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-8, the present invention in a preferred embodiment is plumb post apparatus 10 comprising first post 20 and second post 21, wherein posts 20, 21 each preferably comprise tops 22a, 22b, respectively, bottoms 23a, 23b, respectively, insides 24a, 24b, respectively, outsides 25a, 25b, respectively, front sides 26a, 26b, respectively, back sides 27a, 27b, respectively, first legs 30 and second legs 40. Tops 22a, 22b preferably comprise first throughholes 28a, 28b, respectively, and second throughholes 29a, 29b, respectively, wherein second throughholes 29a, 29b are preferably disposed lower on tops 22a, 22b than first throughholes 28a, 28b, respectively, and wherein first throughholes 28a, 28b are preferably separated from second throughholes 29a, 29b, respectively, by a distance selected to ensure that first throughholes 28a, 28b do not pass through any portion of second throughholes 29a, 29b, respectively.

First throughholes 28a, 28b preferably pass through posts 20, 21 from front sides 26a, 26b, respectively, to back sides 27a, 27b, respectively, and second throughholes 29a, 29b preferably pass through posts 20, 21 from insides 24a, 24b, respectively, to outsides 25a, 25b respectively. First legs 30 are preferably secured to posts 20, 21 at front sides 26a, 26b, respectively, thereof via pivot fasteners 230, wherein pivot fasteners 230 preferably comprise bolts 240 and wing nuts 250, and wherein pivot fasteners 230 preferably pass through first throughholes 28a, 28b, thereby permitting first legs 30 to swing about pivot fasteners 230 for subsequent positioning. Second legs 40 are preferably secured to posts 20, 21 at outsides 25a, 25b thereof, respectively, via pivot fasteners 231, wherein pivot fasteners 231 preferably comprise bolts 241 and wing nuts 251, and wherein pivot fasteners 231 preferably pass through second throughholes 29a, 29b, thereby permitting second legs 40 to swing about pivot fasteners 231 for subsequent positioning.

First post 20 and second post 21 further preferably comprise first levels 50a, 50b, respectively, and second levels 60a, 60b, respectively, wherein first levels 50a, 50b are preferably recessed into posts 20, 21, respectively, and preferably disposed on front sides 26a, 26b, respectively, of posts 20, 21, below first throughholes 28a, 28b, respectively, and wherein second levels 60a, 60b are preferably recessed into posts 20, 21, respectively, and preferably disposed on outsides 25a, 25b, respectively, of posts 20, 21, respectively, below second throughholes 29a, 29b, respectively. Further, posts 20, 21 preferably comprise base plates 200a, 200b, respectively, preferably secured at bottoms 23a, 23b thereof, wherein base plates 200a, 200b each preferably comprise first base plate mounts 210 and second base plate mounts 220, and wherein base plate mounts 210, 220 preferably comprise base plate apertures 180 therein (best shown in FIG. 7).

Levels 50a, 50b, 60a, 60b preferably comprise bubble or spirit levels. It will be recognized by those skilled in the art that any type of indicator of a level disposition of posts 20, 21 could be utilized in lieu of a spirit level. It will be further recognized that first levels 50a, 50b could be disposed on back sides 27a, 27b.

Referring more particularly to FIGS. 3-6, legs 30, 40 preferably comprise stakes 150, wherein stakes 150 preferably comprise points 160 and stake pivot holes 170 and wherein legs 30, 40 further comprise upper sections 70 and lower sections 80, and wherein upper sections 70 preferably comprise first ends 72 and second ends 74, and wherein lower sections 80 preferably comprise first termini 82 and second termini 84. Upper sections 70 comprise pivot holes 110, first adjustment apertures 120 and second adjustment apertures 130, wherein upper pivot holes 110 are preferably disposed at first ends 72 and second adjustment apertures 130 are preferably disposed at second ends 74, with first adjustment apertures 120 preferably being disposed approximately midway between first ends 72 and second ends 74. Lower sections 80 further preferably comprise slots 90, wherein slots 90 are preferably disposed beginning proximate first termini 82 and preferably extend substantially along lower sections 80 toward second termini 84, wherein second termini 84 preferably comprise lower pivot holes 100.

It will be recognized by those skilled in the art that upper sections 70 could alternatively comprise slots 90 and lower sections 80 could comprise adjustment apertures 120, 130 without departing from the spirit of the preferred embodiment.

To assemble legs 30, 40, upper sections 70 are preferably secured to lower sections 80 via fasteners 232, wherein fasteners 232 preferably comprise bolts 242 and wing nuts 252, and wherein for each leg 30, 40, fasteners 232 are preferably secured through each of first adjustment throughholes 120 and second adjustment throughholes 130, both fasteners 232 preferably engaging slot 90, thereby securing each upper section 70 to its respective lower section 80. Stakes 150 are preferably secured to lower sections 80 via fasteners 233 (comprising bolts 243 and wing nuts 253), wherein fasteners 233 preferably pass through stake pivot holes 170 and lower pivot holes 100, thereby preferably pivotally securing stakes 150 to each of legs 30, 40.

To use, posts 20, 21 are preferably disposed at opposite ends of course of bricks BC with insides 24a, 24b preferably facing each other, and legs 30, 40 are preferably pivoted outward forming an angle between legs 30, 40 and each of posts 20, 21. Legs 30, 40 are preferably secured to ground G via stakes 150, wherein points 160 of stakes 150 are preferably driven into ground G. Selectively, spikes 190 are preferably driven through base plate apertures 180 into ground G to fixedly secure posts 20, 21 to ground G (best shown in FIG. 2).

Once legs 30, 40 are secured, legs 30, 40 are preferably adjusted to position each of posts 20, 21 level by loosening fasteners 232 and slidably positioning upper sections 70 relative to lower sections 80, thereby lengthening or shortening legs 30, 40 until levels 50a, 50b, 60a, 60b indicate that posts 20, 21 are level. Once posts 20, 21 are level, fasteners 232 are preferably re-engaged to secure upper sections 70 to lower sections 80.

Builder's or mason's line STR is preferably secured to corner blocks CB, wherein corner blocks CB are preferably placed on posts 20, 21 and mason's line STR is preferably tightened to provide a reference for laying bricks B along brick course BC.

Posts 20, 21 preferably comprise a rectangular construction timber, such as, for exemplary purposes only, a "two by two"; that is, a two-inch by two-inch piece of lumber. It will be recognized by those skilled in the art that posts 20, 21, legs 30, 40 and stakes 150 could comprise, for exemplary purposes only, wood, plastic, metal, composite, or other similar fabricating material.

In an alternate embodiment, pivot fasteners 230 and 231 could comprise rivets or any other similar fastener as is known in the art that would allow pivoting of legs 30, 40.

In a further alternate embodiment, fasteners 232 and 233 could comprise any locking fastener, such as, for exemplary purposes only, cam locking fasteners.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A plumb post apparatus comprising:
   a first substantially-vertical post and a second substantially-vertical post, wherein said posts each comprise a front, a back, an inside and an outside, and wherein a first spirit level is disposed on said front of each of said posts, and wherein a second spirit level is disposed on said outside of each of said posts, and
   four legs, wherein two of said four legs are pivotally secured to said first substantially-vertical post, and wherein two of said four legs are pivotally secured to said second substantially-vertical post.

2. The plumb post apparatus of claim 1, wherein two of said four legs are secured to said front sides of said posts and two of said legs are secured to said outsides of said posts.

3. The plumb post apparatus of claim 1, wherein each of said four legs comprises an upper section and a lower section, and wherein said upper sections and said lower sections are slidably secured together.

4. The plumb post apparatus of claim 3, wherein each of said lower sections comprises a slot, and wherein said slots extend along a substantial portion of said lower sections.

5. The plumb post apparatus of claim 4, wherein each of said upper sections comprises at least three apertures therein, and wherein two of said at least three apertures are dimensioned to receive securing fasteners, and wherein said securing fasteners engage said slots of said lower sections.

6. The plumb post apparatus of claim 5, wherein one of said at least three apertures is dimensioned to receive a pivoting fastener, and wherein said pivoting fastener is utilized to secure said legs to said posts.

7. The plumb post apparatus of claim 2, wherein each of said legs further comprises a stake, and wherein each of said stakes is pivotally secured at a bottom end of each of said legs.

8. The plumb post apparatus of claim 1, wherein each of said posts comprises a top end and a bottom end, and wherein each of said posts further comprises a base plate secured to said bottom end.

9. The plumb post apparatus of claim 8, wherein each of said base plates comprises at least one mounting tab, and wherein said at least one mounting tab comprises an aperture dimensioned to receive a securing spike therethrough.

10. The plumb post apparatus of claim 9, wherein said legs are disposed proximate said top ends of said first substantially-vertical post and said second substantially-vertical post.

11. The plumb post apparatus of claim 10, wherein two of said four legs are secured to said front sides of said posts and two of said legs are secured to said outsides of said posts.

12. The plumb post apparatus of claim 1, wherein each of said legs further comprises a stake pivotally secured thereto.

13. A method of setting a plumb line, said method comprising the steps of:
    obtaining a plumb post apparatus comprising a first substantially-vertical post and a substantially-vertical second post, wherein said posts each comprise a front, a back, an inside and an outside, and wherein a first level is disposed on said front of each of said posts, and wherein a second level is disposed on said outside of each of said posts, said plumb post apparatus further comprising four legs, wherein two of said four legs are pivotally secured to said first substantially-vertical post, and wherein two of said four legs are pivotally secured to said second substantially-vertical post;
    placing said first substantially-vertical post at a first end of a course for laying bricks and placing said second substantially-vertical post at a second end of the course for laying bricks, wherein said insides face each other;
    adjusting said legs in position until said levels indicate that said posts are vertical;
    securing said legs in said adjusted position; and
    securing corner blocks to said posts, wherein said corner blocks are disposed at each end of a mason's line.

14. The method of claim 13, further comprising the steps of:
    shooting a transit line; and
    adjusting said mason's line to conform to said transit line.

15. The method of claim 13, further comprising the step of:
    staking said legs to a ground surface, wherein each of said legs comprises a pivoting stake at an end thereof.

16. The method of claim 13, further comprising the steps of:
    securing a base plate to each of said posts; and
    securing said posts to a ground surface via a spike disposed through said base plates.

17. A component for a plumb setting apparatus said component comprising:
    a post, wherein said post comprises two bubble levels, one each disposed on any two adjacent sides of said post; and
    two legs, one each disposed on any two adjacent sides of said post, wherein said legs are pivotally secured to said post.

18. The component of claim 17, wherein one of said two legs and one of said two bubble levels are disposed on a same side of said post.

19. The component of claim 18, wherein the other of said two legs and the other of said two bubble levels are disposed on a second same side of said post.

20. The component of claim 17, wherein each of said two legs comprises an upper section and a lower section, and wherein said upper section and said lower section are slidably engaged and secured together.

\* \* \* \* \*